US011148169B2

(12) United States Patent  
Torigoe et al.

(10) Patent No.: US 11,148,169 B2  
(45) Date of Patent: Oct. 19, 2021

(54) METHOD OF FORMING SPRAYED COATING, HIGH-TEMPERATURE COMPONENT FOR TURBINE, TURBINE, MASKING PIN FOR FORMING SPRAYED COATING, AND MASKING MEMBER

(71) Applicant: MITSUBISHI HITACHI POWER SYSTEMS, LTD., Kanagawa (JP)

(72) Inventors: Taiji Torigoe, Tokyo (JP); Masahiko Mega, Tokyo (JP); Yoshifumi Okajima, Tokyo (JP); Shuji Tanigawa, Tokyo (JP); Masamitsu Kuwabara, Yokohama (JP); Naotoshi Okaya, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 697 days.

(21) Appl. No.: 15/515,677

(22) PCT Filed: Dec. 3, 2015

(86) PCT No.: PCT/JP2015/084012  
§ 371 (c)(1),  
(2) Date: Mar. 30, 2017

(87) PCT Pub. No.: WO2016/088833  
PCT Pub. Date: Jun. 9, 2016

(65) Prior Publication Data  
US 2017/0297054 A1  Oct. 19, 2017

(30) Foreign Application Priority Data

Dec. 3, 2014 (JP) .............................. JP2014-244642

(51) Int. Cl.  
*C23C 4/02* (2006.01)  
*C23C 4/18* (2006.01)  
(Continued)

(52) U.S. Cl.  
CPC ................. *B05D 1/32* (2013.01); *B05D 1/02* (2013.01); *B05D 3/062* (2013.01); *B05D 7/14* (2013.01);  
(Continued)

(58) Field of Classification Search  
CPC .. B05B 12/26; C23C 4/02; C23C 4/18; B05D 1/32; B05D 1/02; B05D 3/062;  
(Continued)

(56) References Cited

U.S. PATENT DOCUMENTS 7,045,172 B2   5/2006  Taylor et al.  
8,021,719 B2   9/2011  Graichen  
(Continued)

FOREIGN PATENT DOCUMENTS

CN   1625609   6/2005  
CN   1833044   9/2006  
(Continued)

OTHER PUBLICATIONS

International Preliminary Report on Patentability and Written Opinion of the International Searching Authority dated Jun. 15, 2017 in International (PCT) Application No. PCT/JP2015/084012 with English translation.

(Continued)

*Primary Examiner* — Dah-Wei D. Yuan  
*Assistant Examiner* — Nga Leung V Law  
(74) *Attorney, Agent, or Firm* — Wenderoth, Lind & Ponack, L.L.P.

(57) ABSTRACT

A method of forming a sprayed coating includes preparing a spray target member having a surface on which openings of first ends of holes are formed, preparing a plurality of masking pins each of which comprises metal, and inserting each of the masking pins into a corresponding one of the holes so that each of the masking pins partially protrudes (Continued)

from the surface. The method also includes applying an adhesive agent for fixing the masking pins to the respective holes, to at least one of the holes or the masking pins, forming a ceramic layer by spraying on the surface of the spraying target member, the ceramic layer comprising a ceramic material, while the masking pins are fixed to the respective holes via the adhesive agent, and removing the masking pins from the holes after the spraying step.

8 Claims, 9 Drawing Sheets

(51) Int. Cl.
  *F01D 5/28* (2006.01)
  *F01D 5/18* (2006.01)
  *B05D 1/32* (2006.01)
  *B05D 1/02* (2006.01)
  *B05D 3/06* (2006.01)
  *B05D 7/14* (2006.01)
  *C23C 26/00* (2006.01)
  *F01D 9/04* (2006.01)
  *F23R 3/00* (2006.01)

(52) U.S. Cl.
  CPC ............... *C23C 4/02* (2013.01); *C23C 4/18* (2013.01); *C23C 26/00* (2013.01); *F01D 5/186* (2013.01); *F01D 5/284* (2013.01); *F01D 5/288* (2013.01); *F01D 9/04* (2013.01); *F23R 3/002* (2013.01); *F05D 2220/32* (2013.01); *F05D 2230/311* (2013.01); *F05D 2230/90* (2013.01); *F05D 2240/35* (2013.01); *F05D 2300/20* (2013.01); *F05D 2300/44* (2013.01); *F05D 2300/611* (2013.01); *Y02T 50/60* (2013.01)

(58) Field of Classification Search
  CPC . B05D 7/14; F01D 5/288; F01D 5/186; F01D 5/284; F01D 2230/44; F01D 2230/311; F01D 2230/611; F01D 2230/20; F01D 2230/32; F01D 2230/90; F01D 2240/35
  USPC .................................................. 427/446–456
  See application file for complete search history.

(56) References Cited

U.S. PATENT DOCUMENTS

| | | |
|---|---|---|
| 9,051,879 B2 | 6/2015 | Ohara |
| 9,518,317 B2 | 12/2016 | Eminoglu et al. |
| 2005/0084657 A1 | 4/2005 | Ohara |
| 2006/0052880 A1* | 3/2006 | Brosnahan, III .... A61F 2/30767 623/23.39 |
| 2015/0231665 A1* | 8/2015 | Strock ..................... B05B 12/20 427/282 |

FOREIGN PATENT DOCUMENTS

| | | | |
|---|---|---|---|
| CN | 101772587 | 7/2010 | |
| CN | 103388118 | 11/2013 | |
| CN | 104024465 | 9/2014 | |
| EP | 1 076 107 | 2/2001 | |
| EP | 1245691 A2 * | 10/2002 | ............... C23C 8/04 |
| EP | 1835045 | 9/2007 | |
| EP | 2 423 346 | 2/2012 | |
| IL | 83173 | 7/1990 | |
| JP | 2961091 | 10/1999 | |
| JP | 2001-349201 | 12/2001 | |
| JP | 2003-201957 | 7/2003 | |
| JP | 2003-306760 | 10/2003 | |
| JP | 2003306760 A * | 10/2003 | |
| JP | 2003-342707 | 12/2003 | |
| JP | 2003-343205 | 12/2003 | |
| JP | 2004-003506 | 1/2004 | |
| JP | 2005-194560 | 7/2005 | |
| JP | 2006-307842 | 11/2006 | |
| WO | 2004/013368 | 2/2004 | |
| WO | 2007/144374 | 12/2007 | |
| WO | 2013/101921 | 7/2013 | |

OTHER PUBLICATIONS

Korean Office Action dated May 9, 2018 in corresponding Korean Patent Application No. 10-2017-7011250 with Machine Translation.
International Preliminary Report on Patentability and Written Opinion of the International Searching Authority dated Jun. 6, 2017 in International (PCT) Application No. PCT/JP2015/084012 with English translation.
Office Action dated Aug. 2, 2018 in corresponding Chinese Application No. 201580052436.8, with English translation.
International Search Report dated Feb. 16, 2016 in International (PCT) Application No. PCT/JP2015/084012.
Notification of Reasons for Refusal dated Aug. 18, 2017 in corresponding Japanese Application No. 2014-244642, with English translation.
Office Action dated Jun. 16, 2020 in corresponding German Patent Application No. 112015004458.2, with English Translation.

* cited by examiner

METHOD OF FORMING SPRAYED COATING, HIGH-TEMPERATURE COMPONENT FOR TURBINE, TURBINE, MASKING PIN FOR FORMING SPRAYED COATING, AND MASKING MEMBER

TECHNICAL FIELD

The present disclosure relates to a method of forming a sprayed coating, a high-temperature component for a turbine, a turbine, and a masking pin and a masking member for forming a sprayed coating.

BACKGROUND ART

Techniques have been developed to improve thermal efficiency of thermal power generation as a measure for saving energy. To improve thermal efficiency of a gas turbine for power generation, it is effective to increase a gas inlet temperature.

To increase a gas inlet temperature, it is necessary to form high-temperature basic components such as stationary vanes, rotating blades, a ring segment, a transition piece of a combustor, and the like, which constitute a gas turbine, from heat-resistant members. Further, it is necessary to form a thermal barrier coating (TBC) on the basic components made from heat-resistant members.

Thermal barrier coating includes a metallic bond layer and a ceramic layer applied in series on a substrate. A ceramic layer is formed on a metallic bond layer by thermal spraying, for instance, and is often made from a $ZrO_2$-based material, yttria-stabilized zirconia (YSZ) in particular, which is a $ZrO_2$ partially or fully stabilized by addition of $Y_2O_3$, for YSZ has a relatively low thermal conductivity and a relatively high thermal expansion rate among ceramic materials.

Meanwhile, a plurality of cooling holes is formed on the surface of high-temperature components for a turbine to perform film cooling on the high-temperature components. When forming a ceramic layer on a substrate by spraying, a masking pin is inserted into a hole of the substrate to prevent clogging of the hole which is to serve as a cooling hole.

Patent Publication JP2003-306760A discloses a masking pin made from graphite, fiber-reinforced plastic, or a metal-core member covered with polyethylene resin or fluororesin. The masking pin does not get bound to a ceramic layer when the ceramic layer is formed, and dissolves entirely or partially. Thus, the masking pin disclosed in JP2003-306760A does not need to be removed from the hole after forming the ceramic layer. In case the masking pin needs to be removed, it can be easily pulled out.

SUMMARY

Problems to be Solved

Gas turbines with an even higher thermal efficiency have been developed in recent years, some of them having a gas inlet temperature of as high as 1700° C. In this case, the surface temperature of stationary vanes and rotating blades is assumed to increase to 1300° C. In accordance with the above trend in the research and development, the thermal barrier coating is required to have an even higher thermal resistance and barrier property.

To enhance the barrier property of the thermal barrier coating, one may consider increasing the thickness of the ceramic layer. With an increase in the thickness of a ceramic layer, the length of the cooling hole penetrating through the ceramic layer also increases, and thus it is necessary to increase the length of the masking pin that protrudes from the substrate when the ceramic layer is formed by spraying.

However, if the protruding length is increased, the masking pin made from a material that dissolves entirely or partially as disclosed in JP2003-306760A may get damaged upon thermal spraying or may be displaced from an intended position, which may lead to coverage of the hole of the substrate with the ceramic layer.

Also, if the protruding length is increased, the masking pin and the ceramic layer make contact with each other at a larger contact area, which makes it more difficult to remove the masking pin in case the masking pin does not dissolve entirely or partially when the ceramic layer is formed.

Furthermore, the opening portion of the cooling hole may have a shape other than a cylindrical shape, such as a widening shape whose cross-sectional area gradually increases toward the opening outlet. It is laborious to form opening portions having such a widening shape on the ceramic layer one at a time by hand.

Further, it is also laborious to insert a masking pin into each of the plurality of holes one by one.

In view of the above, an object of at least one embodiment of the present invention is to provide: a method of forming a sprayed coating whereby it is possible to form a hole reliably with a masking pin protruding at a greater length from a spray target member; a high-temperature component for a turbine produced by the method; a turbine having the high-temperature component; and a masking pin and a masking member for the method.

Further, an object of at least one embodiment of the present invention is to provide: a method of forming a sprayed coating whereby it is possible to easily remove a masking pin that remains without dissolving entirely or partially upon thermal spraying from a spray target member; a high-temperature component for a turbine produced by the method; a turbine having the high-temperature component; and a masking pin and a masking member for the method.

Further, an object of at least one embodiment of the present invention is to provide a masking pin whereby it is possible to readily provide a hole having an opening portion of a desired shape.

Still further, an object of at least one embodiment of the present invention is to provide a masking member having a plurality of shaft portions that can be easily inserted into a plurality of holes of a spray target member.

Solution to the Problems (1) A method of forming a sprayed coating according to at least one embodiment of the present invention comprises: a step of preparing a spray target member having a surface on which openings of first ends of a plurality of holes are formed; a step of preparing a plurality of masking pins each of which comprises metal; an inserting step of inserting each of the plurality of masking pins into a corresponding one of the plurality of holes so that each of the plurality of masking pins partially protrudes from the surface; an adhesive-agent applying step of applying an adhesive agent for fixing the plurality of masking pins to the respective holes, to at least one of the plurality of holes or the plurality of masking pins; a spraying step of forming a ceramic layer by spraying on the surface of the spraying target member, the ceramic layer comprising a ceramic material, while the plurality of masking pins are fixed to the respective holes via the adhesive agent; and a removing step of removing the plurality of masking pins from the plurality of holes after the spraying step.

In the above method of forming a sprayed coating (1), the masking pin made from metal is fixed to the hole of the spray target member via the adhesive agent. A masking pin made from metal has a high heat-resistant property, and thus does not get damaged or dissolve when the ceramic layer is sprayed, even if the masking pin protrudes from the spray target member at a great protruding length. Thus, the holes of the spray target member do not get blocked by the ceramic layer, and it is possible to form the holes through the ceramic layer in conformity to the shape of the masking pins.

(2) In some embodiments, in the above configuration (1), the method further comprises an ultraviolet emitting step of emitting ultraviolet to an ultraviolet curable resin which serves as the adhesive agent to fix the plurality of masking pins to the respective holes via the adhesive agent. The removing step includes decomposing the ultraviolet curable resin by heating.

In the above described method of forming a sprayed coating (2), the masking pins are fixed to the holes of the spray target member with an ultraviolet curable resin, and thus it is unnecessary to fix the masking pins to the holes by press fitting. Further, the ultraviolet curable resin for fixing the masking pins can be decomposed by heating. Thus, even if the masking pins do not dissolve entirely or partially when the ceramic layer is sprayed, it is possible to easily remove the masking pins from the holes by decomposing the ultraviolet curable resin by heating in the removing step.

(3) In some embodiments, in the above configuration (1) or (2), the adhesive-agent applying step includes injecting the ultraviolet curable resin serving as the adhesive agent into the holes.

According to the above method (3), in the adhesive-agent applying step, the ultraviolet curable resin serving as the adhesive agent is injected into the hole, and thereby it is possible to prevent the adhesive agent from adhering to the surface of the spray target.

(4) In some embodiments, in any one of the above configurations (1) to (3), the method of forming a sprayed coating further comprises a mold-release agent applying step of applying a mold-release agent to portions of the plurality of masking pins to be covered with the ceramic layer, before the portions become covered with the ceramic layer.

In the above configuration (4), the mold release agent is applied in advance to portions of the masking pins to be covered with the ceramic layer, and thereby the masking pins are more slidable relative to the ceramic layer. Thus, it is possible to remove the masking pins with substantially no damage to the ceramic layer, even for the masking pins having a great protruding length and making contact with the ceramic layer at a greater contact area.

(5) In some embodiments, in any one of the above configurations (1) to (4), the spray target member has an inner surface on which openings of second ends of the holes are formed. The removing step includes removing the plurality of masking pins from the plurality of holes by moving the plurality of masking pins from a side of the surface toward a side of the inner surface.

In the above configuration (5), the masking pins are moved from the surface side toward the inner surface side, and thereby it is possible to remove the masking pins while suppressing damage to the ceramic layer even further compared with a case in which the masking pins are moved from the inner surface side toward the surface side.

(6) In some embodiments, in the above configuration (5), the removing step includes removing the plurality of masking pins from the plurality of holes by pushing the plurality of masking pins from the side of the surface toward the side of the inner surface.

In the above configuration (6), the masking pins are pushed from the surface side toward the inner surface side, and thereby it is possible to remove the masking pins more easily than in a case in which the masking pins are pulled from the inner surface side.

(7) In some embodiments, in any one of the above configurations (1) to (6), the spray target member has an inner surface on which openings of second ends of the holes are formed. The method further comprises a step of placing a position determination member on a side of the inner surface before the inserting step. The inserting step includes inserting the plurality of masking pins into the holes from a side of the surface until the plurality of masking pins make contact with the position determination member.

The protruding length of the masking pins should not be too long relative to the thickness of the ceramic layer to be formed, for such masking pins cover a broader region upon spraying. On the other hand, the protruding length of the masking pins should not be too short relative to the thickness of the ceramic layer to be formed, for such masking pins are difficult to remove, and may even fail to form the holes through the ceramic layer. Thus, it is desirable to adjust the protruding length of the masking pins from the spray target member to an appropriate length.

In this regard, with the above configuration (7), the masking pins are inserted until making contact with the position determination member, and thereby it is possible to easily adjust the protruding length of the masking pins to an appropriate length.

(8) In some embodiments, in the above configuration (7), the position determination member comprises a heat-resistant tape.

With the above configuration (8), providing a heat-resistant tape makes it possible to limit the insertion depth of the masking pins into the holes simply and reliably, and thereby to adjust the protruding length of the masking pins.

(9) A method of forming a sprayed coating according to at least one embodiment of the present invention comprises: a step of preparing a spray target member having a surface on which openings of first ends of a plurality of holes are formed; a step of preparing a plurality of masking pins each of which comprises metal; an inserting step of inserting each of the plurality of masking pins into a corresponding one of the plurality of holes so that each of the plurality of masking pins partially protrudes from the surface; a spraying step of forming a ceramic layer by spraying on the surface of the spraying target member, the ceramic layer comprising a ceramic material, while the plurality of masking pins are inserted and fixed to the respective holes; a mold-release-agent applying step of, before the spraying step, applying a mold release agent to portions of the plurality of masking pins to be covered with the ceramic layer; and a removing step of removing the plurality of masking pins from the plurality of holes after the spraying step.

In the above configuration (9), the mold release agent is applied in advance to portions of the masking pins to be covered with the ceramic layer, and thereby the masking pins are more slidable relative to the ceramic layer. Thus, it is possible to remove the masking pins with substantially no damage to the ceramic layer, even for the masking pins having a great protruding length and making contact with the ceramic layer at a greater contact area.

(10) A high-temperature component for a turbine according to at least one embodiment of the present invention comprises: a substrate having a surface on which openings of first ends of a plurality of holes are formed; a bond layer comprising a metal material, formed on the surface of the substrate; and a ceramic layer comprising a ceramic material, formed by spraying on a surface of the bond layer. The bond layer and the ceramic layer have a plurality of through holes formed thereon continuously to the respective holes. The ceramic layer has a thickness of 0.3 mm or more. The ceramic layer does not include a defect formed by pausing spraying temporarily.

In the above configuration (10), the ceramic layer does not have a defect formed by pausing spraying, even in a case where the ceramic layer has a thickness of 0.3 mm or more. In other words, the ceramic layer is formed by continuous spraying, and does not include a non-successive portion like a phase boundary. Thus, separation starting from the defect does not occur inside the ceramic layer, and thus the ceramic layer has a high reliability. As a result, the high-temperature component for a turbine also has a high reliability.

(11) In some embodiments, in the above configuration (10), the high-temperature component comprises at least one of a combustor, a rotating blade, a stationary vane, or a ring segment.

With the above configuration (11), the combustor, the rotating blade, the stationary vane, and the ring segment being high-temperature components have a high reliability.

(12) A turbine according to at least one embodiment of the present invention comprises at least one of the high-temperature component for a turbine according to the above (10) or (11).

With the above configuration (12), the high-temperature component has a high reliability, and thus the turbine has a high reliability.

(13) A masking pin according to at least one embodiment of the present invention comprises: a shaft portion which is insertable into a hole so as to prevent clogging of the hole upon formation of a ceramic layer by spraying on a surface of a spray target member, the hole having a first end with an opening formed on the surface of the spray target member; and a mold portion capable of defining a contour of a hole which is to be formed through the ceramic layer continuously to the hole of the spray target member.

It is laborious to form holes on the ceramic layer into a desired shape one by one. In this regard, with the masking pin of the above configuration (13), it is possible to shape the contour of a plurality of holes into a desired shape quickly and easily.

(14) A masking member according to at least one embodiment of the present invention comprises: a plurality of shaft portions each of which is insertable into a corresponding one of a plurality of holes so as to prevent clogging of the holes upon forming a ceramic layer by spraying on a surface of a spray target member, each of the holes having a first end with an opening formed on the surface of the spray target member; and a joint portion joining the plurality of shaft portions with each other.

With the masking member having the above configuration (13), it is possible to insert the shaft portions into the plurality of holes simultaneously, which makes it possible to insert shaft portions easily and quickly. Further, it is also possible to remove the shaft portions from the plurality of holes simultaneously when removing the shaft portions, which makes it possible to remove the shaft portions easily and quickly.

Advantageous Effects

According to at least one embodiment of the present invention, it is possible to provide: a method of forming a sprayed coating whereby it is possible to form a hole reliably with a masking pin protruding at a greater length from a spray target member; a high-temperature component for a turbine produced by the method; a turbine having the high-temperature component; and a masking pin and a masking member for the method.

Further, according to at least one embodiment of the present invention, it is possible to provide: a method of forming a sprayed coating whereby it is possible to easily remove a masking pin that remains without dissolving entirely or partially upon spraying from a spray target member; a high-temperature component for a turbine produced by the method; a turbine having the high-temperature component; and a masking pin and a masking member for the method.

Further, according to at least one embodiment of the present invention, it is possible to provide a masking pin whereby it is possible to readily provide a hole having an opening portion of a desired shape.

Still further, according to at least one embodiment of the present invention, it is possible to provide a masking member having a plurality of shaft portions that can be easily inserted into a plurality of holes of a spray target member.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
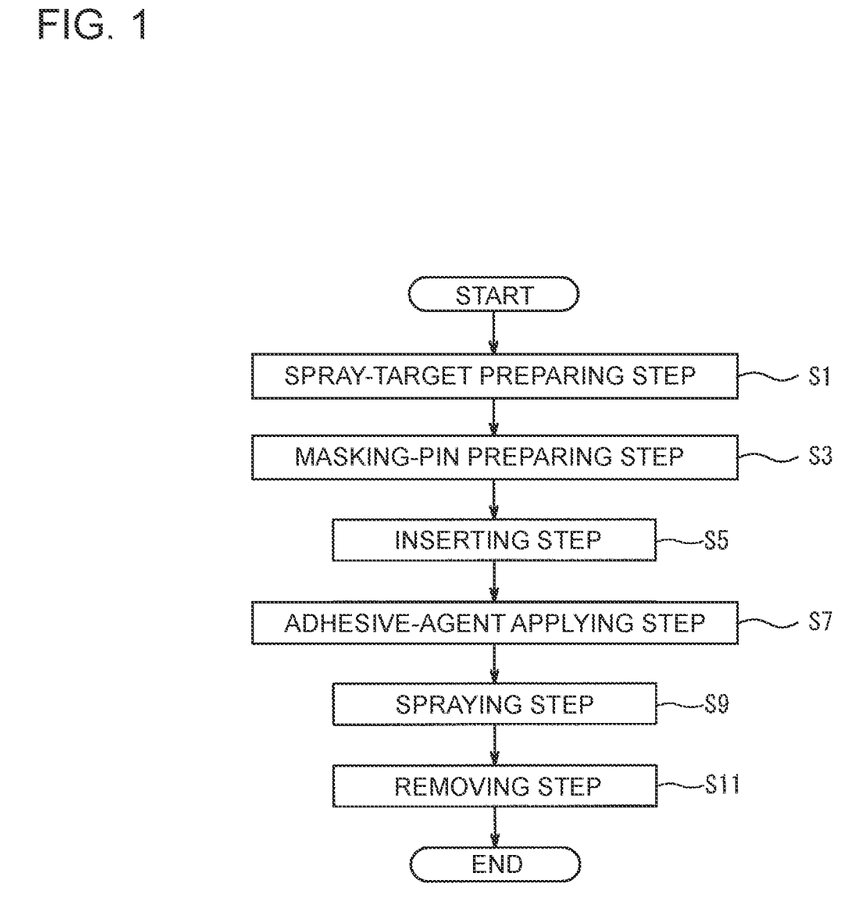
FIG. 1 is a flowchart of a schematic process of a method of forming a sprayed coating according to an embodiment of the present invention.

FIG. 1 is a flowchart of a schematic process of a method of forming a sprayed coating according to an embodiment of the present invention. FIG. 2 is a diagram for describing the method of forming a sprayed coating shown in FIG. 1.

As shown in FIG. 1, the method of forming a sprayed coating includes a spray-target preparing step S1, a masking-pin preparing step S3, an inserting step S5, an adhesive-agent applying step S7, a spraying step S9, and a removing step S11.

In the spray-target preparing step S1, a spray target member 1 is prepared as depicted in FIGS. 2A to 2D. FIGS. 2A to 2D are each a schematic partial cross-sectional view of the spray target member 1, which has a surface on which openings of first ends of a plurality of holes 3 are formed. The diameter of the holes 3 is, for instance, at least 0.3 mm and at most 5.0 mm.

Figure 2A:
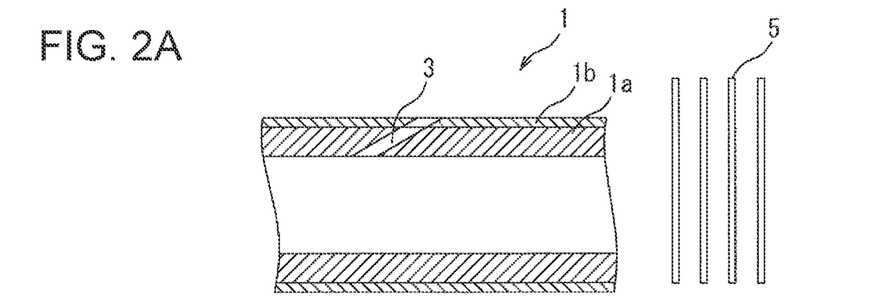
FIGS. 2A-2D are diagrams for describing the method of forming a sprayed coating shown in FIG. 1.

In the masking-pin preparing step S3, as depicted in FIG. 2A, a plurality of masking pins 5 is prepared, each made from metal. Each masking pin 5 has an outer diameter smaller than the diameter of the holes 3.

In the inserting step S5, the plurality of masking pins 5 are inserted into the respective holes 3, so that each masking pin 5 protrudes partially from the surface.

In the adhesive-agent applying step S7, an adhesive agent for fixing the plurality of masking pins 5 to the respective holes 3 is applied to at least one of the plurality of holes 3 or the plurality of masking pins 5. The adhesive agent can be applied by using an injector or a dispenser, or by spraying, dipping, or coating.

The adhesive agent may have a heat-resistant property that can be used under a temperature as high as approximately 400° C., for instance. The adhesive-agent applying step S7 may be performed before the inserting step S5 or after the inserting step S5.

Figure 2B:
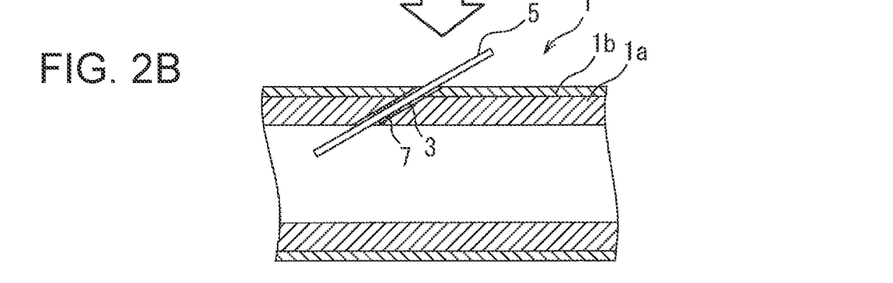
Figure 2C:
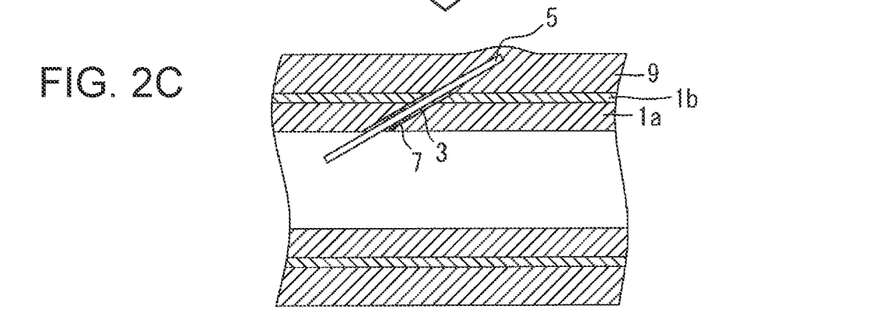

FIG. 2B shows a state in which a pin 5 is fixed to a hole 3 via an adhesive agent 7. In the spraying step S9, as depicted in FIG. 2C, while the plurality of masking pins 5 are fixed to the respective holes 3 via the adhesive agent 7, a ceramic layer 9 made from a ceramic material is formed on the surface of the spray target member by spraying.

Figure 2D:
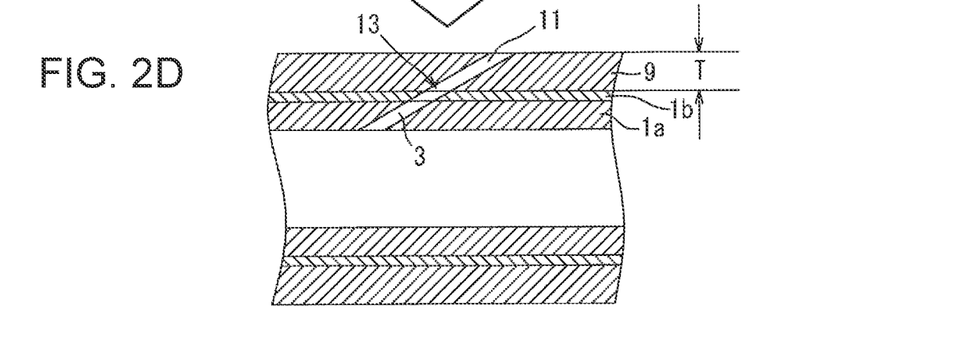

The removing step S11 is performed after the spraying step S9, and the plurality of masking pins 5 are removed from the plurality of holes 3 as depicted in FIG. 2D. After the removing step S11, each of the holes 3 of the spray target member 1 and a corresponding hole 11 formed through the ceramic layer 9 are joined coaxially with each other to form a single cooling hole 13.

In the above embodiment, the masking pin 5 made from metal is fixed to the hole 3 of the spray target member 1 via the adhesive agent 7. The masking pin 5 made from metal has a high heat-resistant property, and thus does not get damaged or dissolve when the ceramic layer 9 is sprayed, even if the masking pin 5 protrudes from the spray target member 1 at a great protruding length. Thus, the hole 3 of the spray target member 1 does not get blocked by the ceramic layer 9, and it is possible to form the hole 11 through the ceramic layer 9 in conformity to the shape of the masking pin 5.

In some embodiments, the masking pins 5 are made from heat-resistant alloy such as nickel-based alloy and cobalt-based alloy. For instance, the masking pin 5 may include a wire made from Inconel (trademark) #625.

In some embodiments, the protruding length of the masking pin 5 from the spray target member 1 is set to be approximately the same as the thickness of the ceramic layer 9.

Figure 3:
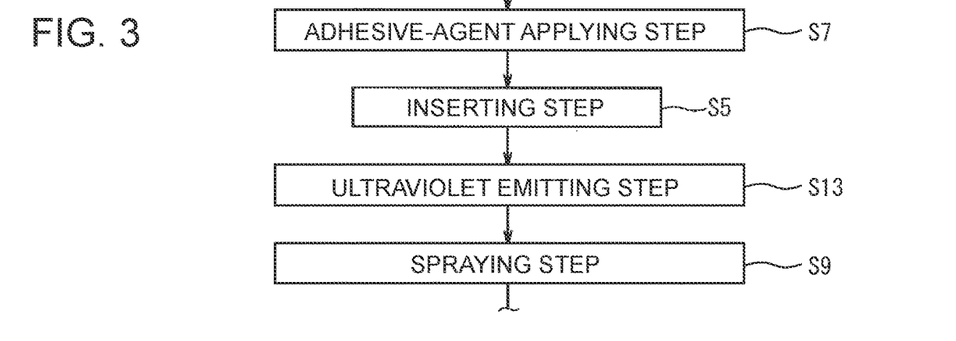
FIG. 3 is a partial flowchart of a schematic process of a method of forming a sprayed coating that uses an ultraviolet curable resin as an adhesive agent.

In some embodiments, an ultraviolet curing resin is used as the adhesive agent. FIG. 3 is a partial flowchart of a schematic process of a method of forming a sprayed coating that uses an ultraviolet curable resin as the adhesive agent 7. As shown in FIG. 3, if an ultraviolet curable resin is used as the adhesive agent 7, the method of forming a sprayed coating further includes an ultraviolet emitting step S13.

In the ultraviolet emitting step S13, an ultraviolet is emitted to an uncured ultraviolet curable resin that is to serve as an adhesive agent, and then the ultraviolet curable resin is cured, whereby the plurality of masking pins 5 are fixed to the respective holes 3 via the adhesive agent.

If the ultraviolet curable resin is used as the adhesive agent 7, the ultraviolet curable resin is decomposed by heating in the removing step S11.

As the ultraviolet curable resin, SpeedMASK of Dymax Corp. can be used, for instance.

In the above described embodiment, the masking pins 5 are fixed to the holes 3 of the spray target member 1 with an ultraviolet curable resin, and thus it is unnecessary to fix the masking pins 5 to the holes 3 by press fitting. Further, the ultraviolet curable resin for fixing the masking pins 5 can be decomposed by heating. Thus, even if the masking pins 5 do not dissolve entirely or partially when the ceramic layer 9 is sprayed, it is possible to easily remove the masking pins 5 from the holes 3 by decomposing the ultraviolet curable resin by heating in the removing step S11.

Figure 4A:
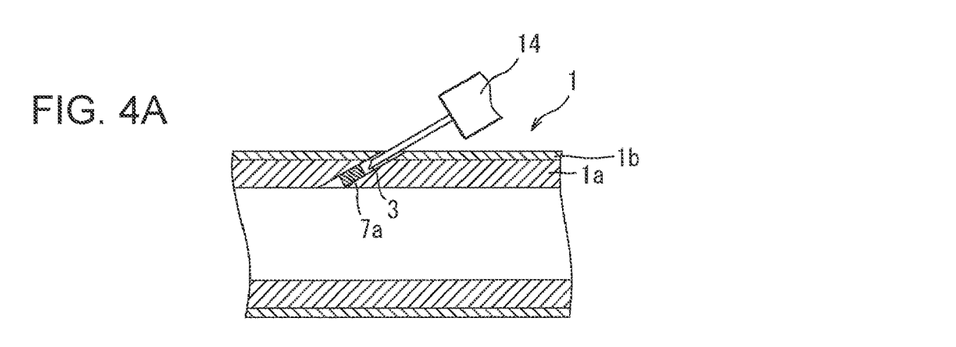
FIGS. 4A and 4B are diagrams for describing an adhesive-agent applying step and an ultra-violet emitting step.
Figure 4B:
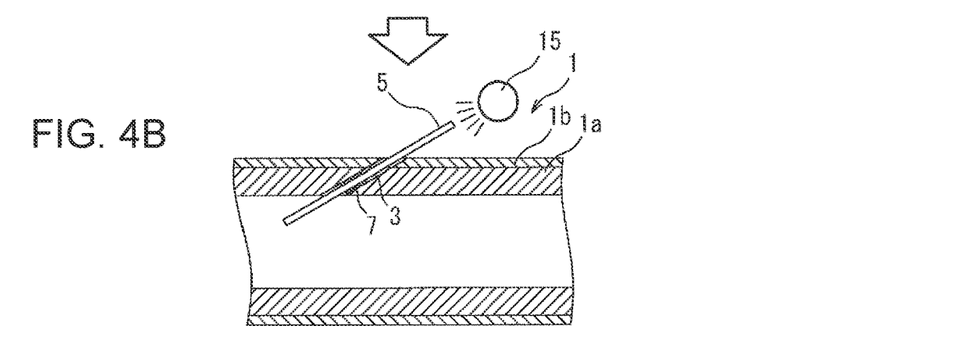

FIG. 4 is a diagram for describing the adhesive-agent applying step S7 and the ultraviolet emitting step S13. In some embodiments, as depicted in FIG. 4A, in the adhesive-agent applying step S7, an uncured ultraviolet curable resin 7a that is to serve as the adhesive agent is injected into the hole 3 of the spray target member 1 with an injector 14, for instance. Then, in the ultraviolet emitting step S13, as depicted in FIG. 4B, ultraviolet is emitted to the ultraviolet curable resin by using an ultraviolet lamp 15, for instance. The ultraviolet lamp 15 may emit ultraviolet from the inner surface side of the spray target member 1.

In the above described embodiment, in the adhesive-agent applying step S7, the ultraviolet curable resin to serve as the adhesive agent is injected into the hole 3, and thereby it is possible to prevent the adhesive agent from adhering to the surface of the spray target member 1.

Figure 5:
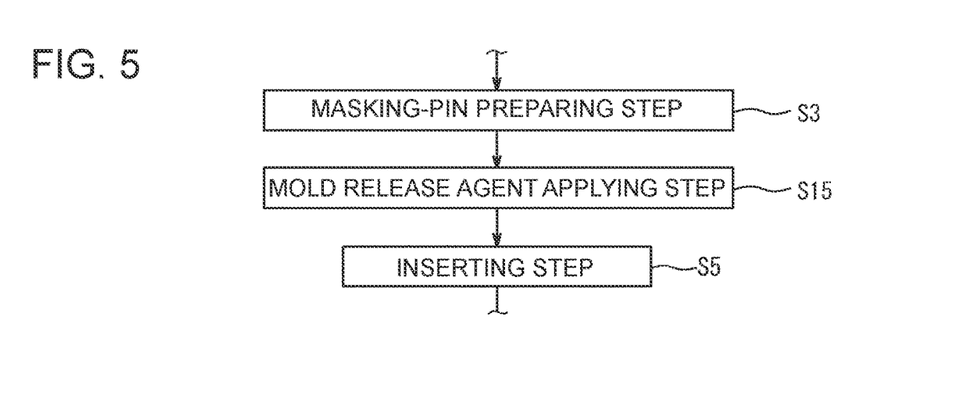
FIG. 5 is a partial flowchart of a schematic process of a method of forming a sprayed coating that uses a mold release agent.

FIG. 5 is a partial flowchart of a schematic process of a method of forming a sprayed coating that uses a mold release agent. As shown in FIG. 5, when a mold release agent is used, the method of forming a sprayed coating further includes a mold release agent applying step S15. The mold release agent applying step S15 is performed before the inserting step S5, and a mold release agent is applied to the masking pins 5. The mold release agent is applied to the masking pins by spraying, dipping, or coating, for instance.

In the above described embodiment, the mold release agent is applied in advance to portions of the masking pins 5 to be covered with the ceramic layer 9, and thereby the masking pins 5 are more slidable relative to the ceramic layer 9. Thus, it is possible to remove the masking pins 5 with substantially no damage to the ceramic layer 9, even for the masking pins 5 having a great protruding length and making contact with the ceramic layer 9 at a greater contact area.

It should be noted that the mold release agent may be applied to the entire masking pins 5.

In some embodiments, as the mold release agent, one of the following agents may be used: a BN-based heat-resistant mold release agent, a silicon-type heat-resistant mold release agent, or a graphite-type heat-resistant mold-release agent. In particular, a BN-based heat-resistant mold release agent contains a powder of boron-nitride (BN) and has a high-heat resistant property, thus being capable of resisting temperatures as high as 900° C. to 1,000° C.

In some embodiments, as depicted in FIG. 2A, the spray target member 1 has an inner surface having openings of the second ends of the holes 3 formed thereon. In the removing step S11, the plurality of masking pins 5 are removed from the plurality of holes 3 by moving the plurality of masking pins 5 from the surface side to the inner surface side of the spray target member 1.

In the above described embodiment, the masking pins 5 are moved from the surface side toward the inner surface side of the spray target member 1, and thereby it is possible to remove the masking pins 5 while suppressing damage to the ceramic layer even further compared with a case in which the masking pins 5 are moved from the inner surface side toward the surface side.

Figure 6:
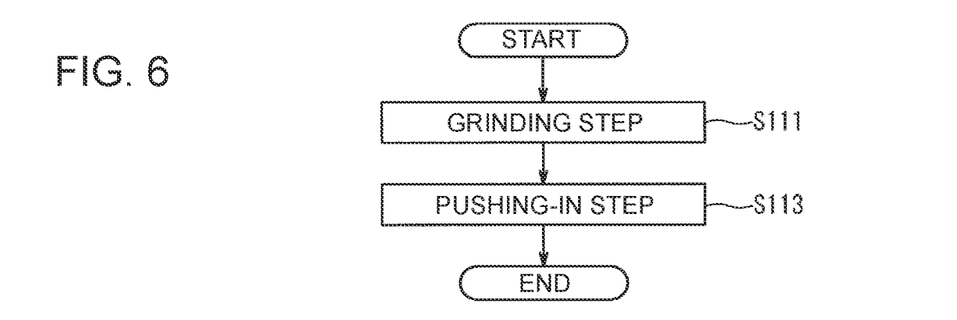
FIG. 6 is a flowchart of a schematic process of a removing step according to some embodiments.
Figure 7:
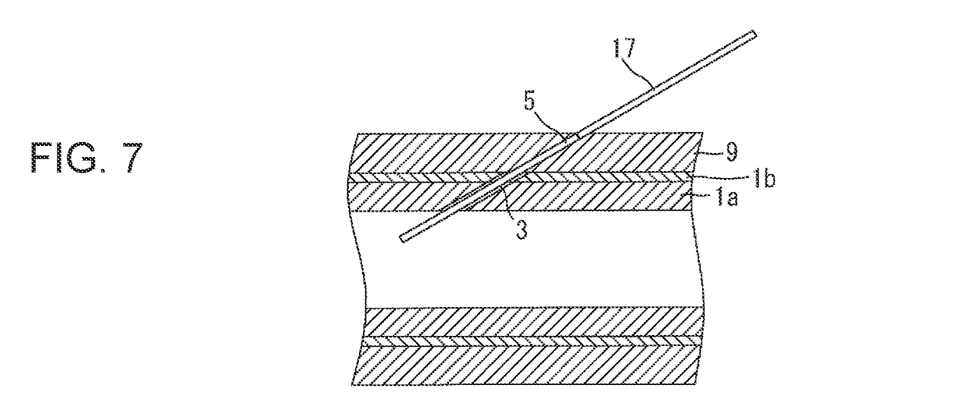
FIG. 7 is a diagram for describing a pushing-in step.
Figure 8:
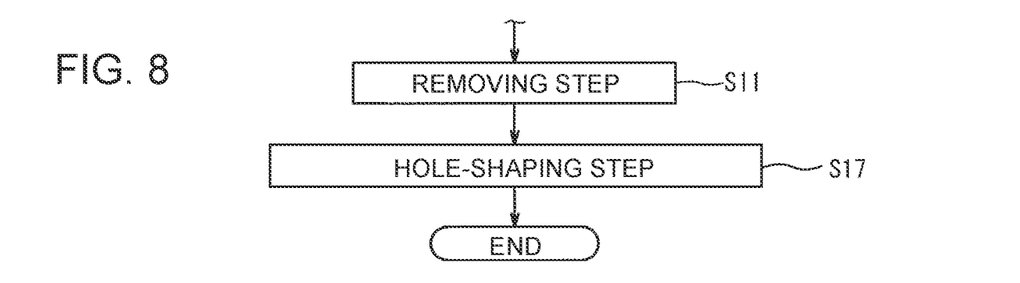
FIG. 8 is a partial flowchart of a schematic process of a method of forming a sprayed coating that includes shaping a hole.

FIG. 6 is a flowchart of a schematic process of the removing step S11 according to some embodiments. In some embodiments, the removing step S11 includes a pushing-in step S113. FIG. 7 is a diagram for describing the pushing-in step S113. As depicted in FIG. 7, in the pushing-in step S113, the plurality of masking pins 5 are pushed from the surface side toward the inner surface side of the spray target member 1 by using a rod-shaped pushing member 17, and thereby removed from the plurality of holes 3. For instance, a piece of wire can be used as the pushing member 17.

If a tip of the masking pin 5 is covered with the ceramic layer 9 as depicted in FIG. 2C immediately after the spraying step S9, the removing step S11 further includes a grinding step S111. In the grinding step S111, the surface of the ceramic layer 9 is ground until the position of the tip of the masking pin 5 becomes recognizable. The grinding is performed by a grinder, for instance, so that the surface of the ceramic layer 9 becomes smooth.

In some embodiments, the method of forming a sprayed coating further includes a hole-shaping step S17. In the hole-shaping step, a file or the like is used to form the contour of the holes 11 on the ceramic layer 9, i.e., the contour of the openings of the cooling holes 13, into a desired contour.

Figure 9:
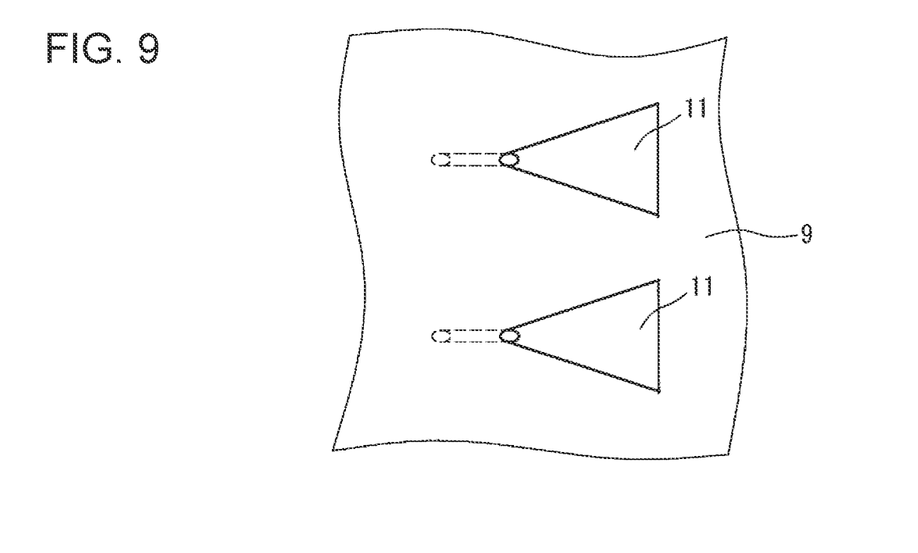
FIG. 9 is a schematic planar view of a shape of a hole of a ceramic layer after performing the hole-shaping step.
Figure 10:
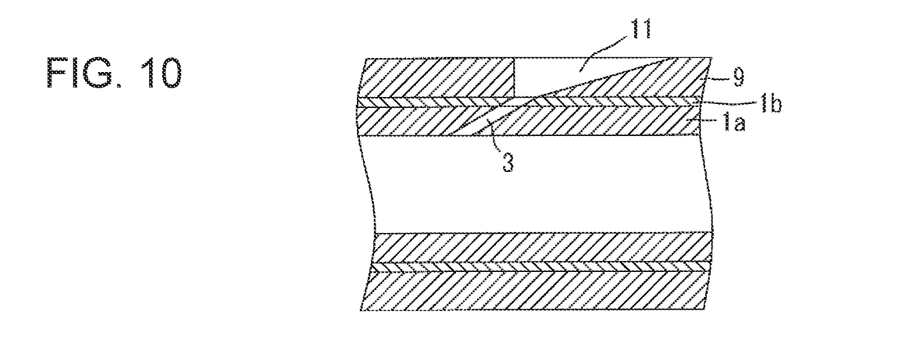
FIG. 10 is a schematic cross-sectional view of a cross-sectional shape of a hole of a ceramic layer.

FIG. 9 is a schematic planar view of an example of a contour of the holes 11 on the ceramic layer 9 after performing the hole-shaping step S17. FIG. 10 is a schematic cross-sectional view of the cross-sectional shape of the hole 11. The cooling holes 13 formed to have a desired contour as in FIGS. 9 and 10 are also referred to as shaped film-cooling holes.

Figure 11:
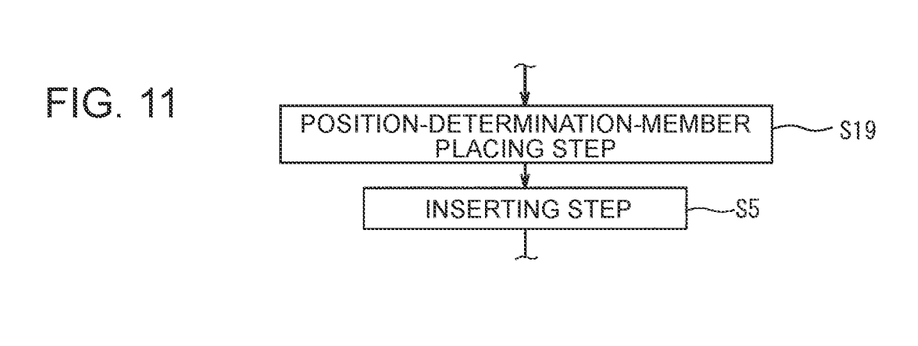
FIG. 11 is a partial flowchart of a schematic process of a method of forming a sprayed coating according to some embodiments.

FIG. 11 is a partial flowchart of a schematic process of a method of forming a sprayed coating according to some embodiments. As shown in FIG. 11, the method of forming a sprayed coating further includes a position-determination-member placing step S19.

Figure 12:
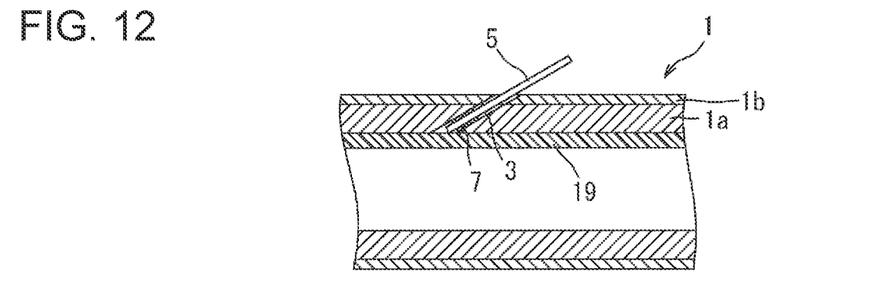
FIG. 12 is a diagram for describing a position-determination-member placing step.

FIG. 12 is a diagram for describing the position-determination-member placing step S19. The position-determination-member placing step S19 is performed before the inserting step S5. The spray target member 1 has an inner surface with openings of the second ends of the holes 3 formed thereon. In the position-determination-member placing step S19, a position determination member 19 is placed on the inner surface side of the spray target member 1.

Further, in the inserting step S5 subsequent to the position-determination-member placing step S19, the plurality of masking pins 5 are inserted into the holes 3 from the surface side of the spray target member 1 until the masking pins 5 make contact with the position determination member 19.

The position determination member 19 comprises a heat-resistant tape, for instance, attached to the inner surface of the spray target member 1. With a heat-resistant tape, it is possible to limit the insertion depth of the masking pins 5 in the holes 3 simply and reliably, and thereby to adjust the protruding length of the masking pins 5.

The protruding length of the masking pins 5 should not be too long relative to the thickness of the ceramic layer 9 to be formed, for such masking pins 5 cover a broader region upon spraying. On the other hand, the protruding length of the masking pins 5 should not be too short relative to the thickness of the ceramic layer 9 to be formed, for such masking pins 5 are difficult to remove, and may even fail to form the holes 11 through the ceramic layer 9. Thus, it is desirable to adjust the protruding length of the masking pins 5 from the spray target member 1 to an appropriate length.

In this regard, with the above embodiment, the masking pins 5 are inserted until making contact with the position determination member 19, and thereby it is possible to easily adjust the protruding length of the masking pins 5 from the surface of the spray target member 1 to an appropriate length.

In some embodiments, the heat-resistant tape serving as the position determination member 19 is attached before the ultraviolet curable resin as the adhesive agent is injected into the holes 3. In this case, the heat-resistant tape prevents outflow of the uncured ultraviolet curable resin from the holes 3, which makes it possible to fix the masking pins 5 reliably via a suitable amount of adhesive agent 7.

Figure 13:
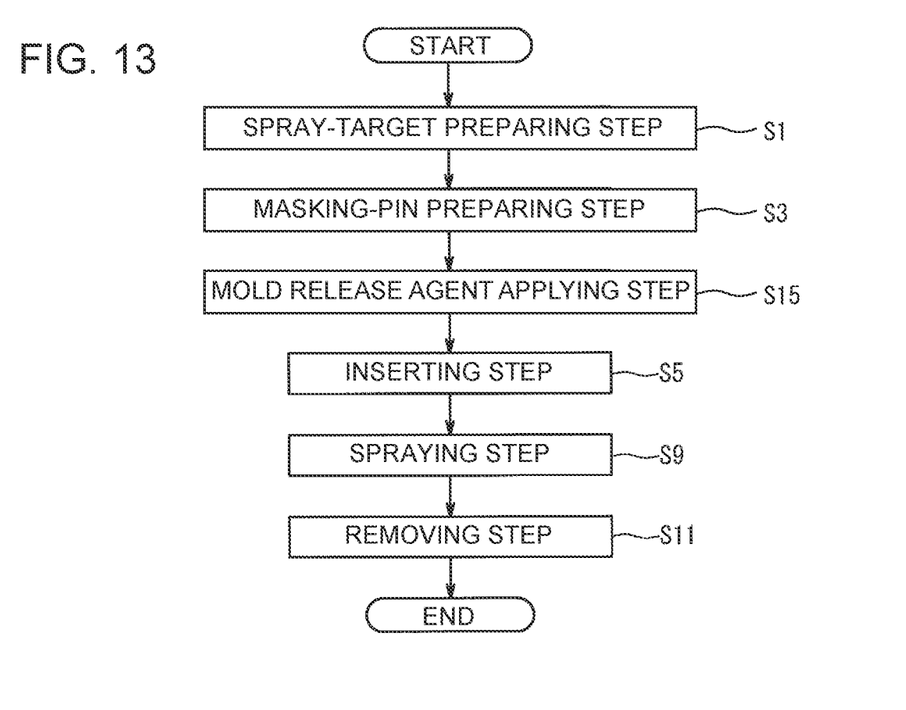
FIG. 13 is a schematic flowchart of a process of a method of forming a sprayed coating according to an embodiment of the present invention.

FIG. 13 is a schematic flowchart of a process of a method of forming a sprayed coating according to an embodiment of the present invention.

The masking pins may not necessarily be fixed to the spray target member via an adhesive agent. For instance, a support member may support the masking pins 5 during the spraying step S9. In this case, the method of forming a sprayed coating in FIG. 13 does not include the adhesive-agent applying step S7.

Instead, the method of forming a sprayed coating in FIG. 13 includes a mold release agent applying step S15 of applying a mold release agent to portions of the plurality of masking pins 5 to be covered with the ceramic layer 9, before the spraying step S9. As described above, the mold release agent applying step S15 is performed before the inserting step S5, and a mold release agent is applied to the masking pins 5. The mold release agent is applied to the masking pins by spraying, dipping, or coating, for instance. As the mold release agent, a mold release agent containing a powder of BN (boron nitride) can be used, for instance. A mold release agent containing a powder of BN has a high heat-resistant property.

In the above described embodiment, the mold release agent is applied in advance to portions of the masking pins 5 to be covered with the ceramic layer 9, and thereby the masking pins 5 are more slidable relative to the ceramic layer 9. Thus, it is possible to remove the masking pins 5 with substantially no damage to the ceramic layer 9, even for the masking pins 5 having a great protruding length from the surface of the spray target member 1 and making contact with the ceramic layer 9 at a greater contact area.

According to an embodiment of the present invention, a high-temperature component for a turbine produced by the above described method of forming a sprayed coating will be described.

As depicted in FIG. 2D, the high-temperature component for a turbine includes a substrate 1a, a bond layer (metallic bond layer) 1b, and a ceramic layer 9. The bond layer 1b and the ceramic layer 9 form a thermal barrier coating on the substrate 1a.

The substrate 1a is made from, for instance, a metal such as Ni-based alloy. For instance, Ni-based alloy has a composition represented by Ni-16Cr-8.5Co-1.75Mo-2.6W-1.75Ta-0.9Nb-3.4Ti-3.4Al (% by mass).

The bond layer 1b is made from, for instance MCrAlY alloy, where M is one or two selected from a group consisting of Ni, Co, and Fe. MCrAlY alloy has a composition represented by Co-32Ni-21Cr-8Al-0.5Y, for example. The thickness of the bond layer 1b is, for instance, at least 10 μm and not more than 500 μm. The bond layer 1b can be formed on the surface of the substrate 1a by high-velocity flame spraying, for instance. A blast processing may be performed on the surface of the substrate 1a to cause the bond layer 1b to be in closer contact with the substrate 1a, before forming the bond layer 1b.

The ceramic layer 9 is formed on the surface of the bond layer 1b. The ceramic layer 9 is made from zirconia-based ceramic containing additive agents such as Y and Yb. The thickness T of the ceramic layer 9 is, for instance, at least 0.1 mm and not more than 3.0 mm. The ceramic layer 9 can be formed on the bond layer 1b by plasma spraying, for instance.

The ceramic layer 9 does not have a defect formed by pausing spraying inside the ceramic layer 9.

With the above described high-temperature component for a turbine, the ceramic layer 9 does not have a defect formed by pausing spraying, even in a case where the ceramic layer 9 has a thickness of 0.3 mm or more. In other words, the ceramic layer 9 is formed by continuous spraying, and does not include a non-successive portion like a phase boundary. Thus, separation starting from the defect does not occur inside the ceramic layer 9, and thus the ceramic layer 9 has a high reliability. As a result, the high-temperature component for a turbine also has a high reliability. The ceramic layer 9 can be sprayed continuously because the masking pins 5 make it possible to form the holes 11 within the ceramic layer 9 having a thickness T of 0.3 mm or more.

Further, if the masking pins 5 are fixed by the adhesive agent 7, it is necessary to decompose the adhesive agent 7 with heat in the removing step S11. If a diffusion thermal processing is to be performed after forming the ceramic layer 9, it is possible to decompose the adhesive agent 7 with heat by performing the diffusion thermal processing. The diffusion thermal processing is performed in a temperature range of 700° C. to 1000° C., for instance.

Figure 14:
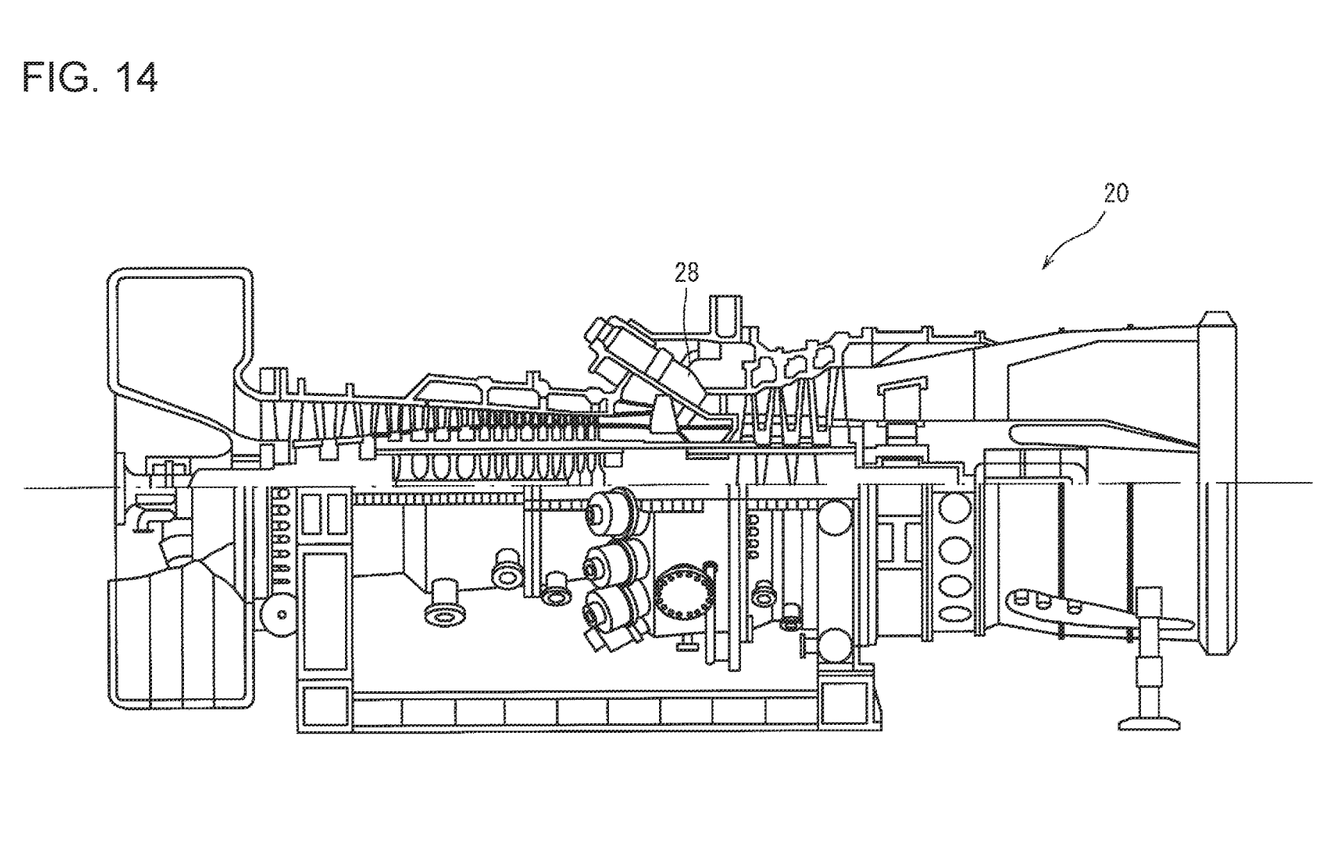
FIG. 14 is a schematic diagram of a gas turbine including a high-temperature component for a turbine produced by using the above described method of forming a sprayed coating.
Figure 15:
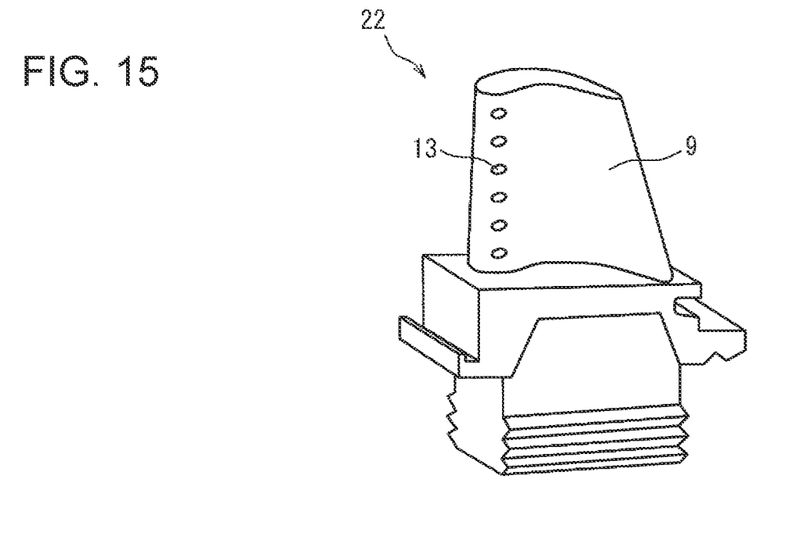
FIG. 15 is a schematic perspective view of a rotating blade that serves as a high-temperature component for a turbine, provided for the gas turbine in FIG. 14.
Figure 16:
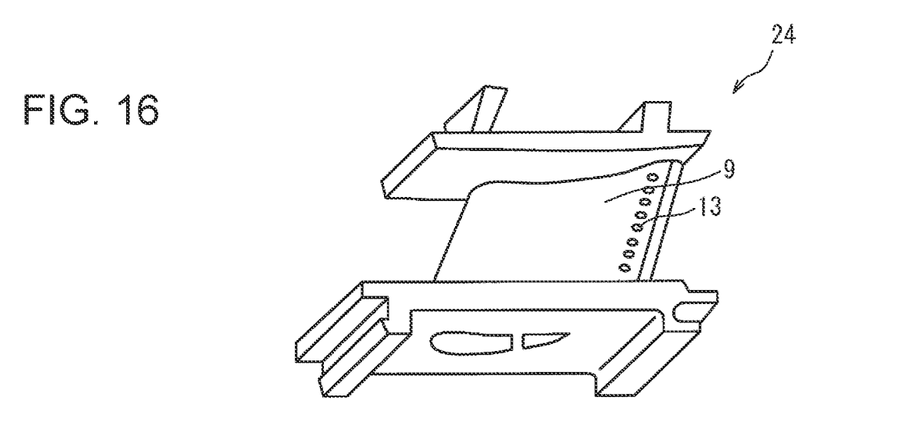
FIG. 16 is a schematic perspective view of a stationary vane that serves as a high-temperature component for a turbine, provided for the gas turbine in FIG. 14.
Figure 17:
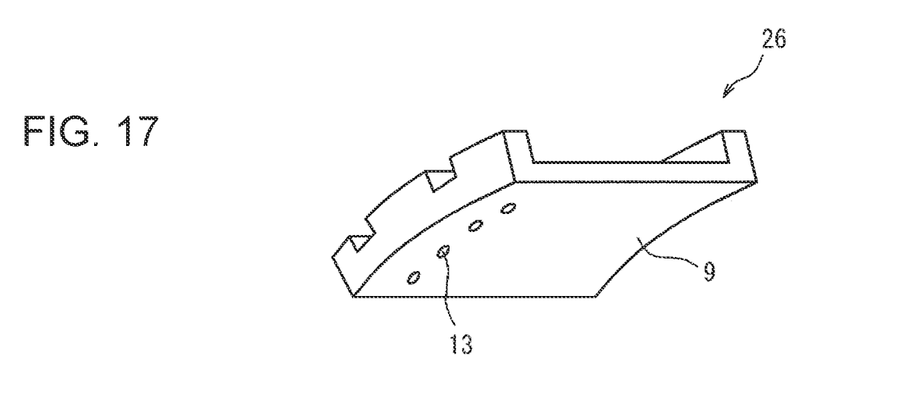
FIG. 17 is a schematic perspective view of a ring segment that serves as a high-temperature component for a turbine, provided for the gas turbine in FIG. 14.

FIG. 14 is a schematic diagram of a gas turbine 20 including a high-temperature component for a turbine produced by using the above described method of forming a sprayed coating. FIGS. 15, 16, and 17 are schematic diagrams of a rotating blade 22, a stationary vane 24, and a ring segment 26, respectively, which are examples of high-temperature components for a turbine applied to the gas turbine 20.

The rotating blade 22 is fixed to a rotor of the gas turbine 20, and the stationary vane 24 and the ring segment 26 are fixed to a casing of the gas turbine 20. The rotating blade 22 and the stationary vane 24 are disposed in a flow path of combustion gas having a cylindrical shape. The ring segment 26 is disposed outside the rotating blade 22 in the radial direction of the rotor, and forms a part of a circumferential wall of a flow path of combustion gas.

The transition piece of the combustor 28, the rotating blade 22, the stationary vane 24, and the ring segment 26 have the ceramic layer 9 formed on the surface thereof by the above described method of forming a sprayed coating, with openings of the cooling holes 13 disposed on the surface of the ceramic layer 9. The cooling holes 13 have openings facing the flow path of combustion gas, and air that flows out from the cooling holes 13 performs film cooling on the combustor 28, the rotating blade 22, the stationary vane 24, and the ring segment 26.

Application of high-temperature components for a turbine is not limited to a fixed gas turbine, and may be a jet engine for planes, a gas turbine for ships, or a steam turbine.

Figure 18:
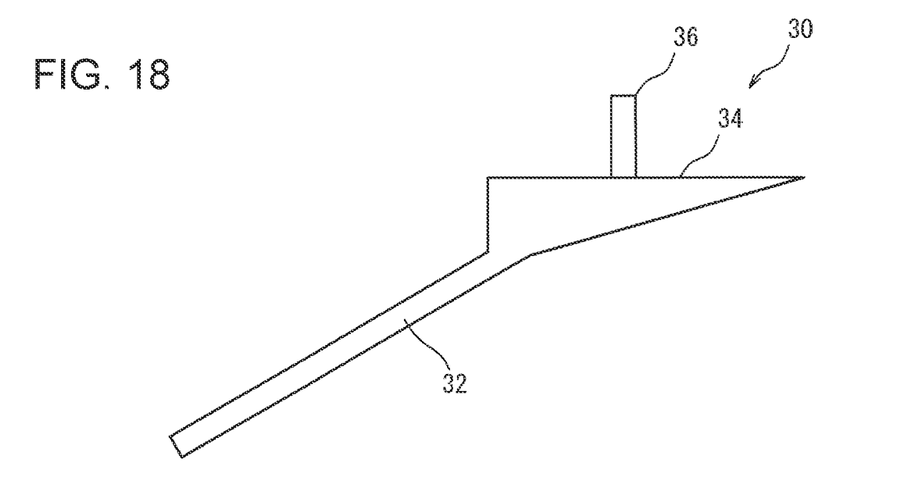
FIG. 18 is a side view schematically showing a masking pin according to an embodiment of the present invention.

FIG. 18 is a side view schematically showing a masking pin 30 according to an embodiment of the present invention. As depicted in FIG. 18, the masking pin 30 includes a shaft portion 32 and a mold portion 34 formed integrally with each other.

The shaft portion 32 has an outer diameter smaller than the diameter of the hole 3, and can be inserted into the hole 3 when the ceramic layer 9 is formed by spraying on the surface of the spray target member 1 having an opening of the first end of the hole 3. The shaft portion 32 prevents clogging of the hole 3 by the ceramic layer 9.

The mold portion 34 can define the contour of the hole 11 to be formed on the ceramic layer 9 continuously to the hole 3 of the spray target member 1. For instance, for the masking pin 30 in FIG. 18, the contour of the hole 11 may be shaped into a widening shape that gradually widens toward the surface of the ceramic layer 9.

While it could be laborious to shape a plurality of holes 11 formed through the ceramic layer 9 in the hole-shaping step S17, the masking pin 30 of the above described embodiment makes it possible to shape the contour of the plurality of holes 11 into a desired contour easily and quickly.

In some embodiments, the masking pin 30 has a handle portion 36 formed integrally with the mold portion 34. If the masking pin 30 has the handle portion 36, it is possible to remove the masking pin 30 easily by holding and pulling at the handle portion 36 in the removing step S11.

Figure 19:
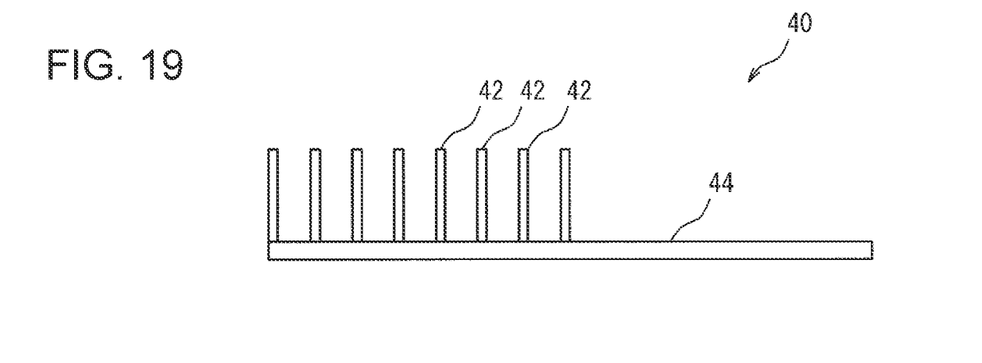
FIG. 19 is a side view schematically showing a masking member according to an embodiment of the present invention.

FIG. 19 is a side view schematically showing the masking member 40 according to an embodiment of the present invention. The masking member 40 is made from metal, and has a plurality of shaft portions 42 and a joint portion 44 formed integrally with each other.

Each shaft portion 42 has an outer diameter smaller than the diameter of the hole 3, and can be inserted into the hole 3 when the ceramic layer 9 is formed by spraying on the surface of the spray target member 1 having an opening of the first end of the hole 3. The shaft portion 42 prevents clogging of the hole 3 by the ceramic layer 9.

The joint portion 44 joins the plurality of shaft portions 42 to one another, and can support the plurality of shaft portions 42 so as to correspond to the arrangement pattern of the holes 3 on the spray target member 1. The joint portion 44 is, for instance, placed on the inner surface side of the spray target member 1, and the shaft portions 42 are inserted into the holes 3 from the inner surface side.

In the inserting step S5, it could be laborious to insert the masking pins 5 into the plurality of holes 3 one at a time. In this regard, with the masking member 40, it is possible to insert the shaft portions 42 into the plurality of holes 3 simultaneously, which makes it possible to perform the inserting step S5 easily and quickly. Further, it is also possible to remove the shaft portions 42 from the plurality of holes 3 simultaneously in the removing step S11, which makes it possible to perform the removing step S11 easily and quickly.

Embodiments of the present invention were described in detail above, but the present invention is not limited thereto, and various amendments and modifications may be implemented.

DESCRIPTION OF REFERENCE NUMERALS

1 Spray target member
1a Substrate
1b Bond layer
3 Hole
5 Masking pin
7 Adhesive agent
7a Uncured ultraviolet curable resin
9 Ceramic layer
11 Hole
13 Cooling hole
14 Injector
15 Ultraviolet lamp
17 Pushing member
19 Position determination member
20 Gas turbine
22 Rotating blade
24 Stationary vane
26 Ring segment
28 Combustor
32 Shaft portion
34 Mold portion
36 Handle portion
40 Masking member
42 Shaft portion
44 Joint portion
S1 Spray-target preparing step
S3 Masking-pin preparing step
S5 Inserting step
S7 Adhesive-agent applying step
S9 Spraying step
S11 Removing step
S13 Ultraviolet emitting step
S15 Mold release agent applying step
S17 Hole-shaping step
S19 Position-determination-member placing step
S111 Grinding step
S113 Pushing-in step

The invention claimed is:

1. A method of forming a sprayed coating, the method comprising:
   a step of preparing a spray target member having a surface on which openings of first ends of a plurality of holes are formed;
   a step of preparing a plurality of masking pins each of which comprises metal, each of the masking pins having an outer diameter that is smaller than a diameter of each of the holes;
   an adhesive-agent applying step of applying an uncured adhesive agent to at least one of the plurality of holes or the plurality of masking pins;
   an inserting step of inserting each of the plurality of masking pins into a corresponding one of the plurality of holes so that each of the plurality of masking pins partially protrudes from the surface after the adhesive-agent applying step;
   a fixing step of curing the uncured adhesive agent to fix the plurality of masking pins to the respective holes after the inserting step;
   a spraying step of forming a ceramic layer by spraying on the surface of the spray target member, the ceramic layer comprising a ceramic material, while the plurality of masking pins are fixed to the respective holes via the curing of the uncured adhesive agent; and
   a removing step of removing the plurality of masking pins from the plurality of holes after the spraying step.

2. The method of forming a sprayed coating according to claim 1, further comprising
   an ultraviolet emitting step of emitting ultraviolet to an ultraviolet curable resin, which serves as the uncured adhesive agent, to fix the plurality of masking pins to the respective holes via the curing of the uncured adhesive agent,
   wherein the removing step includes decomposing the ultraviolet curable resin by heating.

3. The method of forming a sprayed coating according to claim 2, wherein the adhesive-agent applying step includes injecting the ultraviolet curable resin serving as the uncured adhesive agent into the plurality of holes.

4. The method of forming a sprayed coating according to claim 1, further comprising a mold-release agent applying step of applying a mold-release agent to portions of the plurality of masking pins to be covered with the ceramic layer, before the portions become covered with the ceramic layer.

5. The method of forming a sprayed coating according to claim 1,
    wherein the spray target member has an inner surface on which openings of second ends of the plurality of holes are formed, and
    wherein the removing step includes removing the plurality of masking pins from the plurality of holes by moving the plurality of masking pins from a side of the surface toward a side of the inner surface.

6. The method of forming a sprayed coating according to claim 5,
    wherein the removing step includes removing the plurality of masking pins from the plurality of holes by pushing the plurality of masking pins from the side of the surface toward the side of the inner surface.

7. The method of forming a sprayed coating according to claim 1,
    wherein the spray target member has an inner surface on which openings of second ends of the plurality of holes are formed,
    wherein the method further comprises a step of placing a position determination member on a side of the inner surface before the inserting step, and
    wherein the inserting step includes inserting the plurality of masking pins into the plurality of holes from a side of the surface until the plurality of masking pins make contact with the position determination member.

8. The method of forming a sprayed coating according to claim 7,
    wherein the position determination member comprises a heat-resistant tape.

\* \* \* \* \*